(No Model.) 2 Sheets—Sheet 1.
M. G. GROSSCUP.
HAY FORK.
No. 537,413. Patented Apr. 9, 1895.
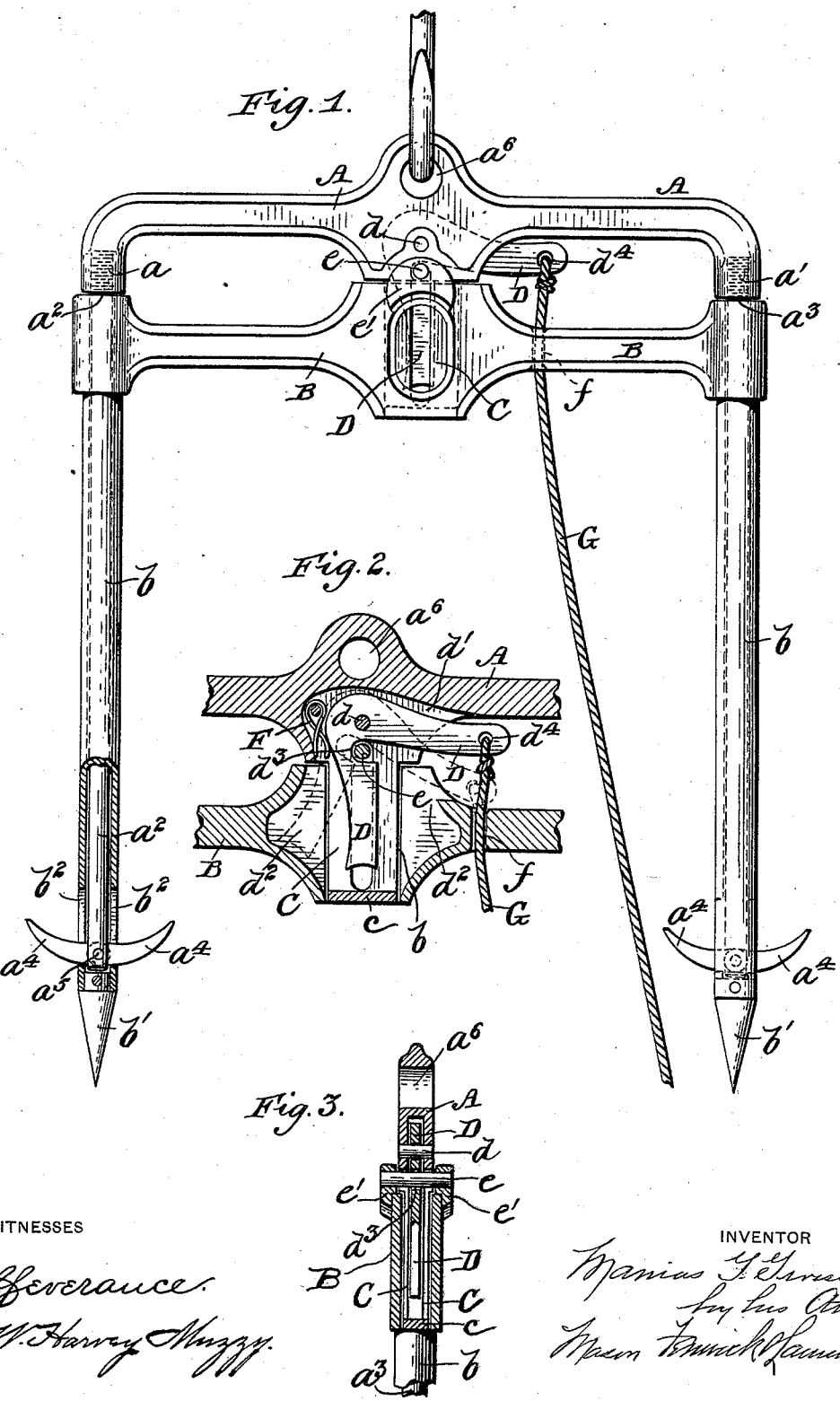

(No Model.)  M. G. GROSSCUP.  2 Sheets—Sheet 2.
HAY FORK.
No. 537,413.  Patented Apr. 9, 1895.
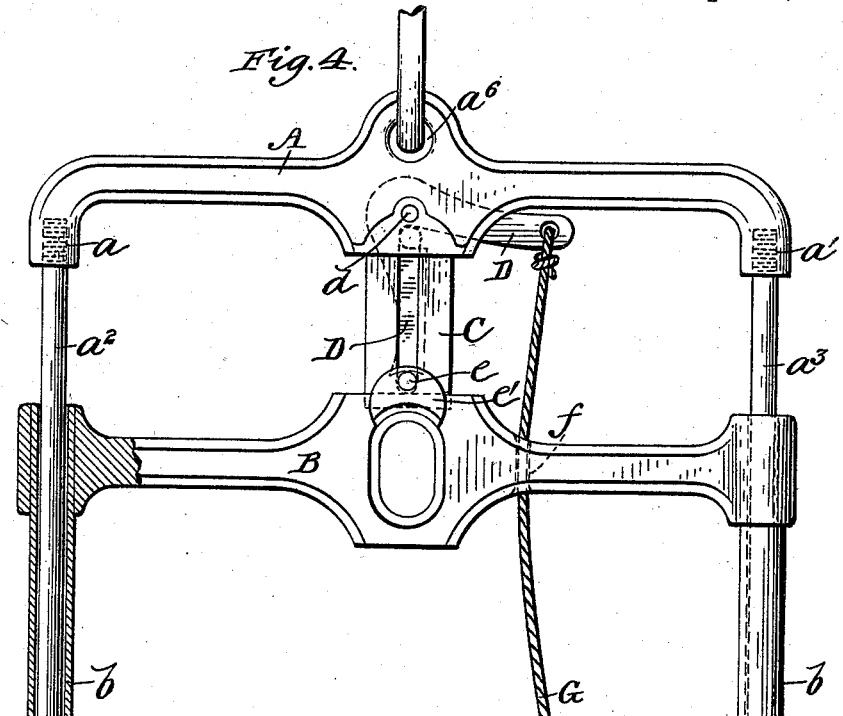
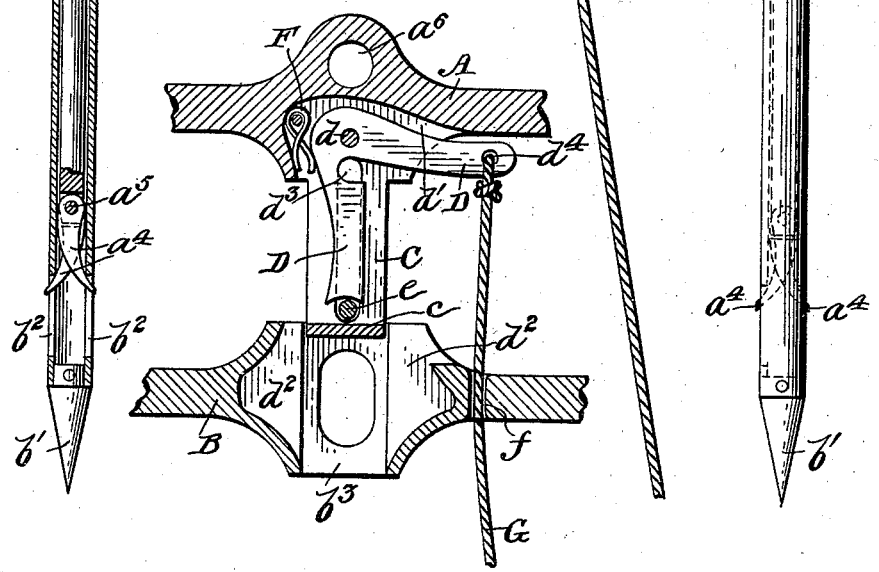

UNITED STATES PATENT OFFICE.

MANIAS G. GROSSCUP, OF CHICAGO, ILLINOIS, ASSIGNOR TO THE WHITMAN & BARNES MANUFACTURING COMPANY, OF SAME PLACE.

HAY-FORK.

SPECIFICATION forming part of Letters Patent No. 537,413, dated April 9, 1895.

Application filed November 30, 1894. Serial No. 530,411. (No model.)

*To all whom it may concern:*

Be it known that I, MANIAS G. GROSSCUP, a citizen of the United States, residing at Chicago, in the county of Cook and State of Illinois, have invented certain new and useful Improvements in Hay-Forks; and I do hereby declare the following to be a full, clear, and exact description of the invention, such as will enable others skilled in the art to which it appertains to make and use the same.

My invention relates to improvements in hay forks and it consists of the combination of an upper supporting head-portion, carrying solid inner portions of tines having pivoted barbs at their lower ends, a lower head-portion carrying outer tubular pointed portions of the tines, and adapted to receive and fully inclose said inner portions and their barbs when the heads are separated, and means for adjustably connecting and locking said head portions, whereby upon certain movements of one of the head portions the barbs are either projected outward or drawn into said tubular portions of the tines, and securely locked in both of said positions.

In the accompanying drawings, forming part of this specification, Figure 1. represents a side elevation of the devices embodying my invention, suspended from a hay elevating and carrying tackle, and with the hay engaging barbs projecting from the tubular portions of the tines. Fig. 2. represents a detail, central, vertical, longitudinal section, showing the position of the locking mechanism when the barbs are projected outward, the trigger being shown in side elevation. Fig. 3. represents a detail, central, vertical, transverse section of the same. Fig. 4. represents a side elevation of the devices embodying my invention, with the barbs drawn within the tubular portions of the tines, and one of the latter shown in section, and Fig. 5. represents a detail, central, vertical, longitudinal section of the locking mechanism while in the position shown in Fig. 4.

A in the drawings, represents an upper supporting head-portion, into the socketed ends $a$, $a'$, of which, solid pendent screw threaded portions $a^2$, $a^3$ of fork tines are secured. These portions of the tines are bifurcated at their lower ends to receive the rounded ends of pointed barbs $a^4$ which are pivoted side by side one another, in said bifurcated ends, by means of pins $a^5$, and are allowed room, by means of the spaces between the prongs of the bifurcated ends to pass within the slots far enough, to offer no serious obstruction to the insertion of the tines into a stack of hay.

B is a lower head-portion provided at each end with pendent tubular portions $b$, $b$ of the said fork tines; said portions having pointed plugs $b'$, $b'$, secured in their lower ends; and also provided with vertical slots $b^2$ above said pointed plugs, through which slots the barbs $a^4$ are adapted to pass when the solid portions $a^2$, $a^3$ of the fork tines are forced down in the hollow portion of said tines.

The head-portion A, is provided, near its middle, with an aperture $a^6$ into which the hook of the elevating tackle is placed. This head-portion A is also provided, near its middle, with a pendent projection C, which is slotted both from front to rear, and from side to side, the latter slot serving to accommodate an angular trigger D, which is connected to the upper head-portion A, by a pivot pin $d$, and the former for permitting a pin $e$, passed through it and mounted in lugs $e'$ on the lower head B, to slide up as said pendent portion C is moved downward through a vertical passage $b^3$ cut in said head-portion B, to permit such movement. Both the under side of the head-portion A, and the upper side of the head-portion B, are provided with a recess, respectively, as $d'$ and $d^2$, to allow free movement of the trigger D at all times.

A bowed spring F is interposed between the wall of the recess $d'$, and the pendent portion of the trigger, so that the normal position of said pendent portion is in a vertical line with the pin $e$.

The trigger D is provided with a notch $d^3$ which is adapted to engage the pin $e$ when the two head portions A and B are together, and the lower end of the pendent arm of the trigger is recessed so as to set on and take a firm hold of said pin $e$ when the two head-portions are apart, and thus lock them in that condition. The trigger is provided with a passage $d^4$, and the head-portion B with a passage $f$, through which passage a trigger operating rope G is passed, and secured to said trigger, as illustrated.

The operation of the device is as follows: The fork is first suspended on the hay elevating and carrying tackle in the barn or field, as the case may be, and the trigger is then sprung so as to permit the devices to assume the position indicated in Fig. 4, with the barbs drawn within the tubular portions of the tines, the head portions A and B separated, and the bottom of the trigger engaging the pin $e$. The points of the tines are then forced into the hay, and the trigger again sprung, either by the rope G or directly by the hand, so as to allow the upper head-portion to descend until the pin $e$ slides into and engages the notch $d^3$; which movement causes the barbs to project out into the hay upon both sides of each tubular portion of the tines, in which position they will remain and consequently carry the hay when the fork is raised. When the hay has been conveyed to the desired position, the rope G is jerked sharply and the trigger again sprung, which allows the head-portion B to descend, and thereby draw the barbs within the tubular portions of the tines, and allow the load of hay to fall. The use of the spring is not absolutely necessary, as the trigger will operate without it, but as it assists and quickens the action of said trigger, its use is preferable.

By providing the outer portions of the tines with separately constructed pointed plugs secured in their lower ends preferably by pins as shown, a saving is effected, as facilities are thus afforded for repairing the tines when their points become dulled or broken; it simply being necessary to unfasten and remove said points, and, in their places, apply others. Simplicity is also secured by constructing the inclosing or outer portions of the tines out of complete tubes, and the inner portions of round metal bars, as the parts of the fork thus constructed can be very readily united by screw threads, sockets, and sleeve like fittings as shown.

I have described a fork having two tines, but it is apparent that my improved construction of tine *per se*, is not necessarily limited to an elevating fork having any particular number of tines.

What I claim is—

In a hay fork, the combination of an upper supporting head-portion carrying solid portions of pendent tines provided with pivoted barbs at their lower ends, a lower head-portion carrying tubular portions of the tines, adapted to receive said barbed portions of the tines, an angular trigger pivoted in the upper head and having its pendent portion notched below its fulcrum point and its lower extremity also recessed, a pin mounted in the lower head so as to engage at proper times the recessed end and the notch in the pendent portion of the trigger, and thus hold the head portions both when separated and together, substantially as described.

In testimony whereof I hereunto affix my signature in presence of two witnesses.

MANIAS G. GROSSCUP.

Witnesses:
 LOUIS M. KRUSE,
 CHAS. W. KRUSE.